United States Patent
Lu

(10) Patent No.: US 9,355,631 B2
(45) Date of Patent: May 31, 2016

(54) MULTILAYER INTERLAYER HAVING SOUND DAMPING PROPERTIES OVER A BROAD TEMPERATURE RANGE

(71) Applicant: Solutia Inc., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 14/514,641

(22) Filed: Oct. 15, 2014

(65) Prior Publication Data
US 2016/0111077 A1   Apr. 21, 2016

(51) Int. Cl.
| | |
|---|---|
| *E04B 1/86* | (2006.01) |
| *G10K 11/168* | (2006.01) |
| *B32B 7/02* | (2006.01) |
| *B32B 27/30* | (2006.01) |

(52) U.S. Cl.
CPC ............... *G10K 11/168* (2013.01); *B32B 7/02* (2013.01); *B32B 27/30* (2013.01); *B32B 2250/02* (2013.01); *B32B 2250/24* (2013.01); *B32B 2307/102* (2013.01); *B32B 2307/536* (2013.01)

(58) Field of Classification Search
CPC ........................................................ E04B 1/86
USPC .......................................... 181/290, 284, 286
See application file for complete search history.

(56) References Cited

U.S. PATENT DOCUMENTS

| | | | |
|---|---|---|---|
| 2,282,057 | A | 5/1942 | Hopkins et al. |
| 4,361,625 | A | 11/1982 | Beckmann et al. |

(Continued)

FOREIGN PATENT DOCUMENTS

| | | |
|---|---|---|
| DE | 10343385 A1 | 4/2005 |
| DE | 102008001512 A1 | 11/2009 |

(Continued)

OTHER PUBLICATIONS

Wade, B.E., Vinyl Acetal Polymers, in Encyclopedia of Polymer Science & Technology, 3rd edition, vol. 8, pp. 381-399, (2003).

(Continued)

*Primary Examiner* — Forrest M Phillips
(74) *Attorney, Agent, or Firm* — Michelle Bugbee

(57) ABSTRACT

A polymer interlayer having improved sound insulation is disclosed. The polymer interlayer comprises at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent; wherein the difference between the first glass transition temperature ($T_g$) the second glass transition temperature ($T_g$) is at least 1.5° C.; and a plasticizer; at least one stiffer layer comprising a third poly(vinyl butyral resin) having a third residual hydroxyl content; and a plasticizer, wherein the polymer interlayer has a damping loss factor ($\eta$) (as measured by Mechanical Impedance Measurement according to ISO 16940) of at least about 0.16 measured at two or more different temperatures selected from 10° C., 20° C. and 30° C.

20 Claims, 2 Drawing Sheets

(56) References Cited

U.S. PATENT DOCUMENTS

| | | | |
|---|---|---|---|
| 5,169,897 | A | 12/1992 | Walls |
| 5,190,826 | A | 3/1993 | Asahina et al. |
| 5,340,654 | A | 8/1994 | Ueda et al. |
| 5,409,734 | A | 4/1995 | Lee et al. |
| 5,728,472 | A | 3/1998 | D'Errico |
| 6,984,679 | B2 | 1/2006 | Papenfuhs et al. |
| 7,510,771 | B2 * | 3/2009 | Lu ................................ 428/437 |
| 7,883,761 | B2 | 2/2011 | Bourcier et al. |
| 8,470,908 | B2 | 6/2013 | Frank |
| 8,597,792 | B2 | 12/2013 | Meise et al. |
| 8,920,930 | B2 | 12/2014 | Meise et al. |
| 9,114,595 | B2 | 8/2015 | Bourcier et al. |
| 2003/0139520 | A1 | 7/2003 | Toyama et al. |
| 2004/0065229 | A1 | 4/2004 | Papenfuhs et al. |
| 2006/0210776 | A1 | 9/2006 | Lu et al. |
| 2007/0036956 | A1 | 2/2007 | Chen et al. |
| 2007/0122629 | A1 * | 5/2007 | Chen et al. ................. 428/423.1 |
| 2007/0148472 | A1 | 6/2007 | Masaki et al. |
| 2007/0289693 | A1 | 12/2007 | Anderson et al. |
| 2008/0268270 | A1 | 10/2008 | Chen et al. |
| 2008/0286542 | A1 | 11/2008 | Hayes et al. |
| 2009/0293952 | A1 | 12/2009 | Koran et al. |
| 2010/0028642 | A1 | 2/2010 | Steuer et al. |
| 2010/0124647 | A1 | 5/2010 | Keller et al. |
| 2012/0133764 | A1 | 5/2012 | Hurlbut |
| 2013/0022824 | A1 | 1/2013 | Meise et al. |
| 2013/0022825 | A1 | 1/2013 | Meise et al. |
| 2013/0189527 | A1 | 7/2013 | Meise et al. |
| 2013/0236693 | A1 | 9/2013 | Lu |
| 2013/0236711 | A1 | 9/2013 | Lu |
| 2013/0274396 | A1 | 10/2013 | Arendt et al. |
| 2014/0363651 | A1 | 12/2014 | Lu et al. |
| 2014/0363652 | A1 | 12/2014 | Lu et al. |
| 2014/0364549 | A1 | 12/2014 | Lu et al. |
| 2014/0364550 | A1 * | 12/2014 | Lu ................................ 524/299 |
| 2015/0158276 | A1 * | 6/2015 | Thompson et al. ............ 524/100 |

FOREIGN PATENT DOCUMENTS

| | | |
|---|---|---|
| WO | WO 2010/108975 A1 | 9/2010 |
| WO | WO 2012/092366 | 7/2012 |

OTHER PUBLICATIONS

PCT International Search Report and Written Opinion dated Aug. 29, 2014 for International Application No. PCT/US2014/041698.
Copending U.S. Appl. No. 14/505,191, filed Oct. 2, 2014, Jun Lu.
Copending U.S. Appl. No. 14/505,247, filed Oct. 2, 2014, Jun Lu.
Copending U.S. Appl. No. 14/563,352, filed Dec. 8, 2014, Zhou Li, et al.
Copending U.S. Appl. No. 14/563,359, filed Dec. 8, 2014, Jun Lu, et al.
Copending U.S. Appl. No. 14/563,364, filed Dec. 8, 2014, Jun Lu, et al.
Copending U.S. Appl. No. 14/563,372, filed Dec. 8, 2014, Jun Lu, et al.
Copending U.S. Appl. No. 14/563,373, filed Dec. 8, 2014, Jun Lu, et al.
Copending U.S. Appl. No. 14/563,378, filed Dec. 8, 2014, Jun Lu, et al.
Copending U.S. Appl. No. 14/563,622, filed Dec. 8, 2014, Jun Lu, et al.
Copending U.S. Appl. No. 14/563,719, filed Dec. 8, 2014, Jun Lu, et al.
Copending U.S. Appl. No. 14/563,011, filed Dec. 8, 2014, Jun Lu.
Copending U.S. Appl. No. 14/563,381, filed Dec. 8, 2014, Jun Lu, et al.
PCT International Search Report and Written Opinion dated Jan. 22, 2015 for International Application No. PCT/US2014/041689.
Office Action dated Apr. 6, 2015 received in co-pending U.S. Appl. No. 14/300,612.
Office Action dated Apr. 15, 2015 received in co-pending U.S. Appl. No. 14/299,996.
ChemicalBook, Triethylene glycol bis(2-ethylhexanoate), Access Jul. 13, 2015 by Examiner, First Page.
Ellis, Bryan and Ray Smith. "Polymers—A Property Database ($2^{nd}$ Edition)", Dec. 2009, Taylor & Francis, $2^{nd}$ Edition, p. 573.
Office Action dated Jul. 6, 2015 received in co-pending U.S. Appl. No. 14/299,975.
Office Action dated Jul. 8, 2015 received in co-pending U.S. Appl. No. 14/299,945.
Office Action dated Jul. 27, 2015 received in co-pending U.S. Appl. No. 14/505,191.
Office Action dated Jul. 27, 2015 received in co-pending U.S. Appl. No. 14/505,247.
Office Action dated Aug. 5, 2015 received in co-pending U.S. Appl. No. 14/300,612.
USPTO Notice of Allowance dated Sep. 9, 2015 for copending U.S. Appl. No. 14/299,996.
Copending U.S. Appl. No. 14/882,317, filed Oct. 13, 2015, Jun Lu, et al.
Office Action dated Nov. 6, 2015 received in co-pending U.S. Appl. No. 14/563,372.
PCT International Search Report and Written Opinion dated Nov. 19, 2015 for International Application No. PCT/US2015/051591.
PCT International Search Report and Written Opinion dated Nov. 19, 2015 for International Application No. PCT/US2015/051593.
USPTO Notice of Allowance dated Nov. 20, 2015 for copending U.S. Appl. No. 14/300,612.
USPTO Notice of Allowance dated Nov. 24, 2015 for copending U.S. Appl. No. 14/299,996.
Office Action dated Nov. 30, 2015 received in co-pending U.S. Appl. No. 14/299,975.
Office Action dated Dec. 3, 2015 received in co-pending U.S. Appl. No. 14/299,945.
Office Action dated Dec. 31, 2015 received in co-pending U.S. Appl. No. 14/505,247.
Office Action dated Jan. 21, 2016 received in co-pending U.S. Appl. No. 14/563,347.
PCT International Search Report and Written Opinion dated Jan. 7, 2016 for International Application No. PCT/US2015/055633.

* cited by examiner

MULTILAYER INTERLAYER HAVING SOUND DAMPING PROPERTIES OVER A BROAD TEMPERATURE RANGE

BACKGROUND OF THE INVENTION

1. Field of the Invention

This disclosure is related to the field of polymer interlayers for multiple layer glass panels and multiple layer glass panels having at least one polymer interlayer sheet. Specifically, this disclosure is related to the field of acoustic polymer interlayers comprising multiple thermoplastic polymer layers.

2. Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes. These applications are commonly referred to as laminated safety glass. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

The thermoplastic polymer found in safety glass can consist of a single layer of a thermoplastic polymer, such as poly(vinyl acetal) or poly(vinyl butyral) (PVB), that has had one or more physical characteristics modified in order to reduce the sound transmission through the glass. Conventional attempts at such acoustic dampening have included using thermoplastic polymers with low glass transition temperatures. Other attempts have included multilayer interlayers using two adjacent layers of thermoplastic polymer wherein the layers have dissimilar characteristics (see, for example U.S. Pat. Nos. 5,340,654, 5,190,826, and 7,510,771). These multilayer interlayers typically comprise a soft core layer having a single poly(vinyl acetal) resin having low residual hydroxyl content and two stiffer outer skin layer having a poly(vinyl acetal) resin having a significantly higher residual hydroxyl content. The soft core layer provides acoustic damping properties, while the stiff skin layers provide handling, processing and mechanical strength of the interlayer. The stiff outer layers generally contribute very little to the acoustic damping properties.

The residual hydroxyl content in the core layer poly(vinyl acetal) resin and the amount of the plasticizer are optimized such that the interlayer provides optimal sound insulation properties at ambient application temperatures for multiple layer glass panels, such as windshields and windows installed on vehicles and buildings. At temperatures above or below the ambient temperature, the sound insulation properties deteriorate significantly. For example, if the tri-layer interlayer composition is optimized such that the multiple layer glass panel comprising the tri-layer interlayer has a maximum sound insulation performance at 20° C. in its coincident frequency region (such as in the region around 5,000 Hz), changing the application temperature by about 10° C., such as decreasing the application temperature to 10° C. or increasing the temperature to 30° C., the sound insulation significantly decreases by several decibels or more. Further lowering or increasing the temperature reduces the sound insulation performance even more.

Multiple layer glass panels produced with conventional multilayer interlayers can have desirable sound insulation in one region of the world, but they can have lower or mediocre sound insulation in other regions of the world where the ambient temperatures differ. Even in the same region, as the seasons change in a year, the sound insulation ability of the glass panels also changes.

Accordingly, there is a need in the art for the development of a multilayer interlayer that has sound insulation performance over a broader temperature range. More specifically, there is a need in the art for the development of multilayer interlayers having at least one soft core layer that provides sound insulation performance over a broader temperature range.

SUMMARY OF THE INVENTION

Because of these and other problems in the art, described herein, among other things are multilayered interlayers comprised of stiff skin layers and a soft core layer(s). In an embodiment, these multilayered interlayers comprise: a first polymer layer (skin layer) comprising plasticized poly(vinyl butyral) resin; a second polymer layer (core layer) comprising a blend of two or more plasticized poly(vinyl butyral) resins having different residual hydroxyl content; and a third polymer layer (skin layer) comprising plasticized poly(vinyl butyral) resin. The second polymer layer is disposed between the first polymer layer and the third polymer layer, resulting in two skin layers and a central core layer.

In an embodiment, a polymer interlayer having improved sound insulation is disclosed, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent; wherein the difference between the first glass transition temperature ($T_g$) the second glass transition temperature ($T_g$) is at least 1.5° C.; and a plasticizer; at least one stiffer layer comprising a third poly(vinyl butyral resin) having a third residual hydroxyl content; and a plasticizer, wherein the polymer interlayer has a damping loss factor ($\eta$) (as measured by Mechanical Impedance Measurement according to ISO 16940) of at least about 0.16 measured at two or more different temperatures selected from 10° C., 20° C. and 30° C.

In embodiments, the polymer interlayer has a damping loss factor ($\eta$) (as measured by Mechanical Impedance Measurement according to ISO 16940) of at least about 0.17 measured at two or more different temperatures selected from 10° C., 20° C. and 30° C., or at least about 0.18, or at least about 0.19, or at least about 0.20, or at least about 0.21, or at least about 0.22 or at least about 0.23 or at least about 0.24, or at least about 0.25.

In embodiments, the second poly(vinyl butyral) resin is present in an amount of from about 5 weight percent to about 50 weight percent, or from about 25 weight percent to about 50 weight percent.

In embodiments, each plasticized resin in the soft layer of the polymer interlayer has a glass transition temperature ($T_g$) less than 20.0° C., or less than 19.0° C., or less than 18.0° C., or less than 17.0° C., or less than 16.0° C., or less than 15.0° C. In embodiments, the difference between the glass transition temperatures ($T_g$) of the first poly(vinyl butyral) resin and the second poly(vinyl butyral) resin is at least 2.0° C., or at least 2.5° C., or at least 3.0° C., or at least 4.0° C., at least 5.0° C.

In embodiments, the residual hydroxyl content of the third poly(vinyl butyral resin) is the same as the residual hydroxyl content of the first poly(vinyl butyral) resin or the second poly(vinyl butyral resin). In embodiments, the difference between the first residual hydroxyl content and the second residual hydroxyl content is at least 2.0 weight percent, or at least 3.0 weight percent, or at least 4.0 weight percent, or at least 5.0 weight percent.

In another embodiment, a polymer interlayer having improved sound insulation is disclosed, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent; wherein the difference between the first glass transition temperature ($T_g$) the second glass transition temperature ($T_g$) is at least 1.5° C.; and a plasticizer; at least one stiffer layer comprising a third poly (vinyl butyral resin) having a third residual hydroxyl content; and a plasticizer, wherein the polymer interlayer has a damping loss factor ($\eta$) (as measured by Mechanical Impedance Measurement according to ISO 16940) of at least about 0.16 measured at two or more different temperatures selected from 10° C., 20° C. and 30° C., and wherein the second poly(vinyl butyral) resin is present in an amount of from about 5 weight percent to about 50 weight percent. In embodiments, the second poly(vinyl butyral) resin is present in an amount of from about 25 weight percent to about 50 weight percent.

In embodiments, the polymer interlayer has a damping loss factor ($\eta$) (as measured by Mechanical Impedance Measurement according to ISO 16940) of at least about 0.17 measured at two or more different temperatures selected from 10° C., 20° C. and 30° C., or at least about 0.18, or at least about 0.19, or at least about 0.20, or at least about 0.21, or at least about 0.22 or at least about 0.23 or at least about 0.24, or at least about 0.25.

In embodiments, each plasticized resin in the soft layer of the polymer interlayer has a glass transition temperature ($T_g$) less than 20.0° C., or less than 19.0° C., or less than 18.0° C., or less than 17.0° C., or less than 16.0° C., or less than 15.0° C. In embodiments, the difference between the glass transition temperatures ($T_g$) of the first poly(vinyl butyral) resin and the second poly(vinyl butyral) resin is at least 2.0° C., or at least 2.5° C., or at least 3.0° C., or at least 4.0° C., at least 5.0° C.

In embodiments, the residual hydroxyl content of the third poly(vinyl butyral resin) is the same as the residual hydroxyl content of the first poly(vinyl butyral) resin or the second poly(vinyl butyral resin). In embodiments, the difference between the first residual hydroxyl content and the second residual hydroxyl content is at least 2.0 weight percent, or at least 3.0 weight percent, or at least 4.0 weight percent, or at least 5.0 weight percent.

In another embodiment, a polymer interlayer having improved sound insulation is disclosed, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent, wherein the difference between the first glass transition temperature ($T_g$) and the second glass transition temperature ($T_g$) is at least 1.5° C.; and a plasticizer; at least one stiffer layer comprising a third poly(vinyl butyral) resin having a third residual hydroxyl content; and a plasticizer, wherein each plasticized resin in the soft layer of the polymer interlayer has a glass transition temperature ($T_g$) less than 20.0° C. In embodiments, each plasticized resin in the soft layer of the polymer interlayer has a glass transition temperature ($T_g$) less than 19.0° C., or less than 18.0° C., or less than 17.0° C., or less than 16.0° C., or less than 15.0° C.

In embodiments, the second poly(vinyl butyral) resin is present in an amount of from about 5 weight percent to about 50 weight percent, or from about 25 weight percent to about 50 weight percent.

In embodiments, the difference between the glass transition temperatures ($T_g$) of the first poly(vinyl butyral) resin and the second poly(vinyl butyral) resin is at least 2.0° C., or at least 2.5° C., or at least 3.0° C., or at least 4.0° C., at least 5.0° C.

In embodiments, the residual hydroxyl content of the third poly(vinyl butyral resin) is the same as the residual hydroxyl content of the first poly(vinyl butyral) resin or the second poly(vinyl butyral resin). In embodiments, the difference between the first residual hydroxyl content and the second residual hydroxyl content is at least 2.0 weight percent, or at least 3.0 weight percent, or at least 4.0 weight percent, or at least 5.0 weight percent.

In embodiments, the polymer interlayer has a damping loss factor ($\eta$) (as measured by Mechanical Impedance Measurement according to ISO 16940) of at least about 0.16 measured at two or more different temperatures selected from 10° C., 20° C. and 30° C., or at least about 0.17, or at least about 0.18, or at least about 0.19, or at least about 0.20, or at least about 0.21, or at least about 0.22 or at least about 0.23 or at least about 0.24, or at least about 0.25.

A multiple layer panel is also disclosed. The multiple layer panel comprises at least one rigid substrate, and a polymer interlayer or multiple layer polymer interlayer as disclosed herein. The panel has improved sound insulation properties.

A method of making a polymer interlayer is also disclosed, wherein the polymer interlayer has improved sound insulation, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent; wherein the difference between the first glass transition temperature ($T_g$) and the second glass transition temperature ($T_g$) is at least 1.5° C.; and a plasticizer; at least one stiffer layer comprising a third poly(vinyl butyral) resin having a third residual hydroxyl content; and a plasticizer, wherein the polymer interlayer has a damping loss factor ($\eta$) (as measured by Mechanical Impedance Measurement according to ISO 16940) of at least about 0.16 measured at two or more different temperatures selected from 10° C., 20° C. and 30° C., as disclosed herein.

A method of making a polymer interlayer is also disclosed, wherein the polymer interlayer has improved sound insulation, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent; wherein the difference between the first glass transition temperature ($T_g$) the second glass transition temperature ($T_g$) is at least 1.5° C.; and a plasticizer; at least one stiffer layer comprising a third poly(vinyl butyral resin) having a third residual hydroxyl content; and a plasticizer, wherein the polymer interlayer has a damping loss factor (η) (as measured by Mechanical Impedance Measurement according to ISO 16940) of at least about 0.16 measured at two or more different temperatures selected from 10° C., 20° C. and 30° C., and wherein the second poly(vinyl butyral) resin is present in an amount of from about 5 weight percent to about 50 weight percent. In embodiments, the second poly(vinyl butyral) resin is present in an amount of from about 25 weight percent to about 50 weight percent, as disclosed herein.

A method of making a polymer interlayer is also disclosed, wherein the polymer interlayer has improved sound insulation, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent, wherein the difference between the first glass transition temperature ($T_g$) and the second glass transition temperature ($T_g$) is at least 1.5° C.; and a plasticizer; at least one stiffer layer comprising a third poly(vinyl butyral resin) having a third residual hydroxyl content; and a plasticizer, wherein each plasticized resin in the soft layer of the polymer interlayer has a glass transition temperature ($T_g$) less than 20.0° C., as disclosed herein.

DESCRIPTION OF THE PREFERRED EMBODIMENT(S)

Figure 1:
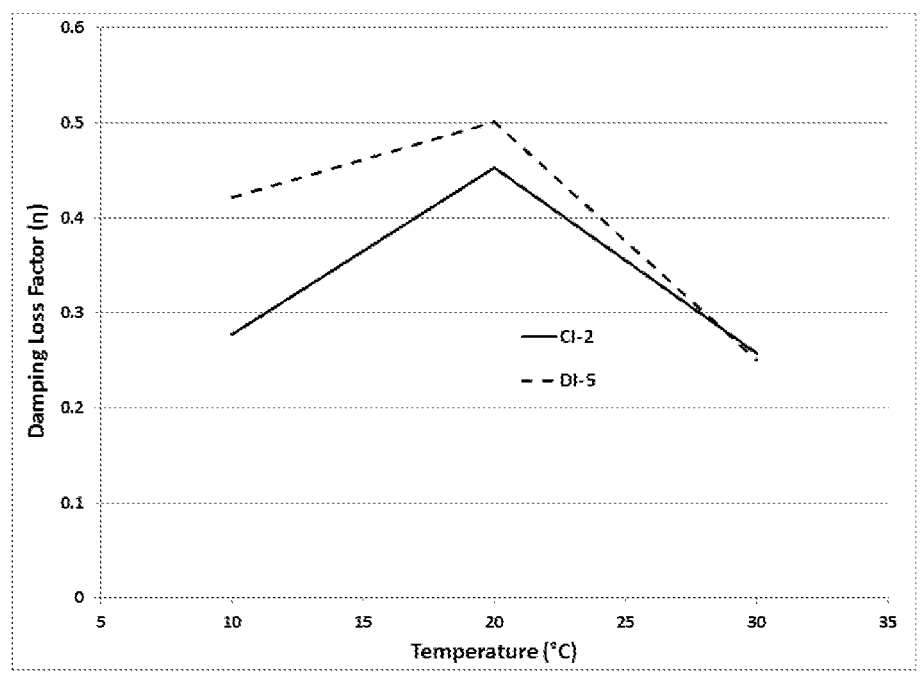
FIG. 1 is a chart showing the damping loss factor at 10° C., 20° C., and 30° C. for a disclosed interlayer (DI-5) and a comparative interlayer (CI-2).

Described herein, among other things, are multilayer interlayers having improved sound insulation comprised of at least one soft core layer comprising a mixture of a first resin and a second resin, and at least one stiff skin layer, wherein the residual hydroxyl content (measured as % PVOH by weight) in the second resin is higher than the residual hydroxyl content in the first resin. In some embodiments, the residual hydroxyl content in the second resin is lower than the residual hydroxyl content in the skin layer(s). The first resin and second resin each have a glass transition temperature ($T_g$), and the glass transition temperatures of the first and second resins are different.

The inventor has surprisingly discovered that the sound insulation property of a multiple layer glass panel can be maintained over a broad temperature range by incorporating a specific multilayer interlayer into the glass panels. The multilayer interlayer has a soft core layer having more than one glass transition. By formulating the core layer in the multiple layer interlayer to have more than one glass transition, as further described herein, the sound insulation property of multiple layer glass panels comprising the improved multiple layer interlayer can be improved compared to glass panels comprising conventional multilayer interlayers having a core layer with only a single glass transition temperature.

Further, because embodiments of the present invention having three polymer layers (i.e., a tri-layer interlayer) can be formulated to be easily handled and can be used as a direct replacement for conventional interlayers in conventional processes, these improved interlayers will be usable in many applications without requiring any modification to the current manufacturing methods. For example, automotive windshields comprising a conventional polymer interlayer can be replaced with an interlayer of the present invention without altering the lamination process used to form the finished windshield.

As used herein, an "interlayer" is any thermoplastic construct that can be used in multiple layer glass applications, such as safety glass in windshields and architectural windows. The terms "multilayer" and "multiple layers" mean an interlayer having more than one layer, and multilayer and multiple layer may be used interchangeably. Multilayer interlayers typically contain at least one soft layer and at least one stiff layer.

In various embodiments of the present invention, a multiple layer interlayer comprises two polymer layers disposed in contact with each other, wherein one polymer layer is soft and the other polymer layer is stiff, and wherein each polymer layer comprises a thermoplastic polymer resin. The thermoplastic polymer can be the same or different in each layer.

Multiple layer glass panels having good sound insulation properties over a broad temperature range can be achieved by formulating the soft core layer to exhibit multiple glass transition temperatures ($T_g$). The soft core layer is then combined with, such as laminated with, one or more stiff layers to form a single, multilayer interlayer by the processes known in the arts, such as co-extrusion or lamination. The soft core layer having multiple glass transition temperatures comprises a mixture of at least a first resin and a second resin, wherein the core resins, either plasticized or unplasticized, each have a different glass transition and glass transition temperature, wherein the glass transition temperature in the second polymer resin differs from the glass transition temperature in the first polymer resin. Additionally, the glass transition in the second polymer resin is lower than the glass transition temperature of the stiff skin or outer layer.

As used herein, the glass transition of a polymer is the state from the "glassy" state into the rubbery state, which is reversible; the glass transition temperature is the temperature that marks the transition from the glassy state to the rubbery state. At the glass transition state, the polymer provides highest acoustic damping, and the glass transition temperature is used to characterize the acoustic insulation property of the polymer. The glass transition temperature ($T_g$) can be determined by dynamic mechanical thermal analysis (DMTA). The DMTA measures the storage (elastic) modulus (G') in Pascals, loss (viscous) modulus (G") in Pascals, tan delta (=G"/G') of the specimen as a function of temperature at a given frequency, and temperature sweep rate. A frequency of 1 Hz and temperature sweep rate of 3° C./min were used. The $T_g$ is then determined by the position of the tan delta peak on the temperature scale in ° C.

In various embodiments of present invention, at least one of the polymer layers comprises a poly(vinyl acetal) resin, such as poly(vinyl butyral), and a plasticizer. In other embodiments, all polymer layers comprise poly(vinyl acetal) resins or poly(vinyl butyral) resins and plasticizers. The soft core layer comprises a mixture of at least a first resin having a first residual hydroxyl content and a second resin having a second residual hydroxyl content, wherein the residual hydroxyl content (measured as % PVOH by weight) in the second resin differs from that in the first resin, and wherein the residual hydroxyl contents in both the first and second resins are lower than the residual hydroxyl content in the skin layer(s).

As used herein, residual hydroxyl content (calculated as % vinyl hydroxyl content or poly(vinyl alcohol) (PVOH) by weight) in PVB refers to the amount of hydroxyl groups remaining on the polymer chains after processing is complete. For example, PVB can be manufactured by hydrolyzing poly(vinyl acetate) to poly(vinyl alcohol) (PVOH), and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual hydroxyl content and residual acetate content is measured on a weight percent basis per ASTM D1396.

In various embodiments, the first PVB resin in the softer core layer is selected, when plasticized, to have a glass transition temperature, $T_{g1}$, and provide a sound insulation property at an application temperature T1, and the second polymer resin having a different residual hydroxyl content is selected to have a glass transition temperature, $T_{g2}$, and provide a sound insulation property at second application temperature T2. More resins having different residual hydroxyl contents than the first and the second resins can also be selected and have glass transition temperatures $T_{g3}, T_{g4}, \ldots T_{gn}$ (where n is the number of different resins), and incorporated into the core layer to provide sound insulation properties at application temperatures T3, T4, ... Tn (where n is the number of different resins), resulting in the core layer having multiple glass transitions and exhibiting multiple glass transition temperatures $T_{g1}, T_{g2}, T_{g3}, T_{g4}, \ldots T_{gn}$, and providing sound insulation properties over a broader temperature range.

Prior art attempts to produce multiple layer interlayers (comprising at least two adjacent polymer layers) that reduce sound transmission through a multiple layer glass panel have relied on various compositional permutations or differences between the two or more layers. Conventional multiple layer interlayers have a core layer that has a single resin and exhibits a single glass transition temperature. One prior art method teaches the use of acetals of differing carbon length (see, for example, U.S. Pat. No. 5,190,826). Another prior art method teaches the use of differing polymerization degrees (see, for example, Japanese Patent Application 3124441A or U.S. Patent Application 2003/0139520 A1). Another method of varying the layers is the use of a PVB resin having residual acetate levels of at least 5 mole % in one of two adjacent layer as a compositional difference (see, for example, Japanese Patent 3,377,848 and U.S. Pat. No. 5,340,654). Finally, other methods use poly(vinyl butyral) resins having different plasticizer concentrations (see, for example, U.S. Pat. No. 7,510,771). All of these interlayers provide sound insulation properties only within a narrow temperature range.

In various embodiments, the core layer comprises two poly(vinyl butyral) resins and a plasticizer. The second plasticized resin has a glass transition temperature which differs by at least about 1.5° C. from that of the first plasticized resin, or at least about 2° C., or at least 2.5° C., or at least 3° C., or at least 4° C., or at least 5° C., or at least 6° C., or at least 7° C., or at least 8° C., or at least 9° C., or at least 10° C., or at least 11° C., or by at least 12° C. or more. The first plasticized resin can have a glass transition temperature from −40° C. to about 25° C., or about −30° C. to 20° C., or about −20° C. to 10° C., or about 25° C. or less, or about 20° C. or less, or about 15° C. or less, or about 10° C. or less, or about 9° C. or less, or about 8° C. or less, or greater than about −40° C., or greater than about −35° C., or greater than about −30° C., or greater than about −25° C., or greater than about −20° C. As used herein, the glass transition temperature of the plasticized resin is determined on the sheet formed by the individual plasticized resin, e.g., prior to mixing with another plasticized resin to form, for example, a core layer.

In various embodiments, the core layer comprises more than two poly(vinyl butyral) resins and a plasticizer. The glass transition temperatures, $T_{g1} T_{g2}, T_{g3}, \ldots$ correspond to each of the plasticized resins and the difference in glass transition temperatures of two adjacent plasticized resins is at least 1.5° C., or at least 1.6° C., or at least 1.7° C., or at least 1.8° C., or at least 1.9° C., or at least 2.0° C., or at least 2.1 C, or at least 2.2° C., or at least 2.3° C., or at least 2.4° C., or at least 2.5 C, or at least 2.6° C., or at least 2.7° C., or at least 2.8° C., or at least 2.9° C., or at least 3.0° C., or at least 4.0° C., or at least 5.0° C. or more.

The differences in glass transition temperature between the first plasticized resin and the second plasticized resin can be achieved by selecting the two resins to have different residual hydroxyl contents. In various embodiments, the second PVB resin in the soft core layer has a residual hydroxyl content that differs by at least about 1.0 wt. % from the residual hydroxyl content of the first PVB resin, or at least about 1.5 wt. %, or at least about 2.0 wt. %, or at least about 2.5 wt. %, or at least about 3.0 wt. %, or at least about 3.5 wt. %, or at least about 4.0 wt. %, or at least about 4.5 wt. %, or at least about 5.0 wt. %, or at least about 5.5 wt. %, or at least about 6.0 wt. %, or at least about 6.5 wt. %, or at least about 7.0 wt. %, or at least about 7.5 wt. %, or at least about 8.0 wt. %, or at least about 8.5 wt. %, or at least about 9.0 wt. %, or at least about 9.5 wt. %, or at least about 10.0 wt. %, or at least about 10.5 wt. %, or at least about 11.0 wt. %, or at least about 11.5 wt. %, or at least about 12 wt. % or more. In particularly useful embodiments, the residual hydroxyl content in the second resin differs from the first resin by about 1.0 wt. % to about 7.0 wt. %. This difference between the first resin and the second resin is calculated by subtracting the residual hydroxyl content of the first resin with the lower residual hydroxyl content from the residual hydroxyl content of the second resin with the greater residual hydroxyl content (or taking the absolute value of the residual hydroxyl content differences). For example, if a first resin has a residual hydroxyl content of 12 wt. %, and a second polymer sheet has a residual hydroxyl content of 15 wt. %, then the residual hydroxyl content of the two resins differs by 3 wt. %, or the residual hydroxyl content in the second resin is 3 wt. % higher than the residual hydroxyl content in the second resin. The difference in the residual hydroxyl content between the first resin and the second is controlled to impart enhanced sound insulation performance to the interlayer, as discussed in fully details in the Examples.

The differences in glass transition temperature between the first plasticized resin and the second plasticized resin can also be achieved by selecting the two resins such that they have the same residual hydroxyl content but different levels of residual vinyl acetate groups or vinyl acetal group content. In various embodiments, the second PVB resin in the soft core layer has a residual hydroxyl content that is the same as the residual hydroxyl content of the first resin but has a the residual vinyl acetate content that differs from the residual vinyl acetate content of the first PVB resin by at least about 1.5 mol %, or at least about 2.0 mol %, or at least about 3.0 mol %, or at least about 4.0 mol %, or at least about 5.0 mol %, or at least about 6.0 mol %, or at least about 7.0 mol %, or at least about 8.0 mol %, or at least about 9.0 mol %, or at least about 10.0 mol %, or at least about 11.0 mol %, or at least about 12.0 mol %, or at least about 13.0 mol %, or at least about 14.0 mol %, or at least about 15.0 mol % or more. In other embodiments, the second PVB resin in the soft core layer has a residual hydroxyl content and a vinyl acetate content that are both different from the first PVB resin.

In embodiments, the second PVB resin has vinyl isobutyral groups and the first resin has vinyl butyral groups; or the second resin contains 2-ethylhexanal groups and the first resin contains vinyl butyral or vinyl isobutyral groups; or either the first or second resin or both contain a mixture of any two of vinyl butyral, vinyl isobutyral, or 2-ethylhexanal groups.

In various embodiments of the present invention, the residual hydroxyl content of the first resin in the core layer and the residual hydroxyl content in the adjacent skin layer can differ by at least about 2.5 wt. %, or at least about 3.0 wt. %, or at least about 3.5 wt. %, or at least about 4.0 wt. %, or at least about 4.5 wt. %, or at least about 5.0 wt. %, or at least about 5.5 wt. %, or at least about 6.0 wt. %, or at least about 6.5 wt. %, or at least about 7.0 wt. %, or at least about 7.5 wt. %, or at least about 8.0 wt. %, or at least about 8.5 wt. %, or at least about 9.0 wt. %, or at least about 9.5 wt. %, or at least about 10.0 wt. %, or at least about 10.5 wt. %, or at least about 11.0 wt. %, or at least about 11.5 wt. %, or at least about 12 wt. % or more. In some embodiments, the residual hydroxyl content in the second resin in the core layer is greater than that of the first resin in the core layer and lower than the residual hydroxyl content of the resin in the skin layer. In further embodiments, the residual hydroxyl content in the second resin in the core layer is lower than that of the first resin. In exemplary embodiments, the higher residual hydroxyl contents of the first and the second resins are less than the residual hydroxyl content of the resin in the skin layer and differs by at least 2.5 wt %, or at least about 3.0 wt. %, or at least about 3.5 wt. %, or at least about 4.0 wt. %, or at least about 4.5 wt. %, or at least about 5.0 wt. %, or at least about 5.5 wt. %, or at least about 6.0 wt. %, or at least about 6.5 wt. %, or at least about 7.0 wt. %, or at least about 7.5 wt. %, or at least about 8.0 wt. %, or at least about 8.5 wt. %, or at least about 9.0 wt. %, or at least about 9.5 wt. %, or at least about 10.0 wt. %, or at least about 10.5 wt. %, or at least about 11.0 wt. %, or at least about 11.5 wt. %, or at least about 12 wt. % or more. In other embodiments, residual hydroxyl content of the resin in the skin layer is the same as the residual hydroxyl content of one of the resins in the core layer.

For a given type of plasticizer, the compatibility of that plasticizer in a poly(vinyl butyral) resin is largely determined by the hydroxyl content. Typically, poly(vinyl butyral) with a greater residual hydroxyl content will result in a reduced plasticizer compatibility or capacity. Likewise, poly(vinyl butyral) with a lower residual hydroxyl content will result in an increased plasticizer compatibility or capacity. These properties can be used to select the hydroxyl content of each poly(vinyl butyral) polymer, fabricate core layer to have broad glass transition, and formulate each of the polymer sheet layers to allow for the proper plasticizer loading and to stably maintain the differences in plasticizer content between the polymer layers and between the two or more resins in the core layer.

FIG. 1 shows the damping loss factor at 10° C., 20° C., and 30° C. for a disclosed interlayer (DI-5) and a comparative interlayer (CI-2). The disclosed interlayer has a core layer containing a 50:50 blend of two resins: a first resin having a residual hydroxyl content of 9.6 wt. % and a second resin having a residual hydroxyl content of about 11.5 wt. %, and an average residual hydroxyl of 10.5 wt. %; and 75 phr plasticizer. The comparative interlayer has a core layer containing a single resin having a residual hydroxyl content of about 10.5 wt. % and 75 phr plasticizer. Both interlayers have a core layer thickness of 10 mils and a total interlayer thickness of 40 mils. The disclosed interlayer having two resins shows improved damping loss factor at both 10° C. and 20° C. while maintaining the damping loss factor at 30° C. (essentially unchanged compared to the comparative interlayer), thus providing sound insulation over a broader range of temperatures (i.e., from 10° C. to 20° C. to 30° C.), and particularly at lower temperatures.

Figure 2:
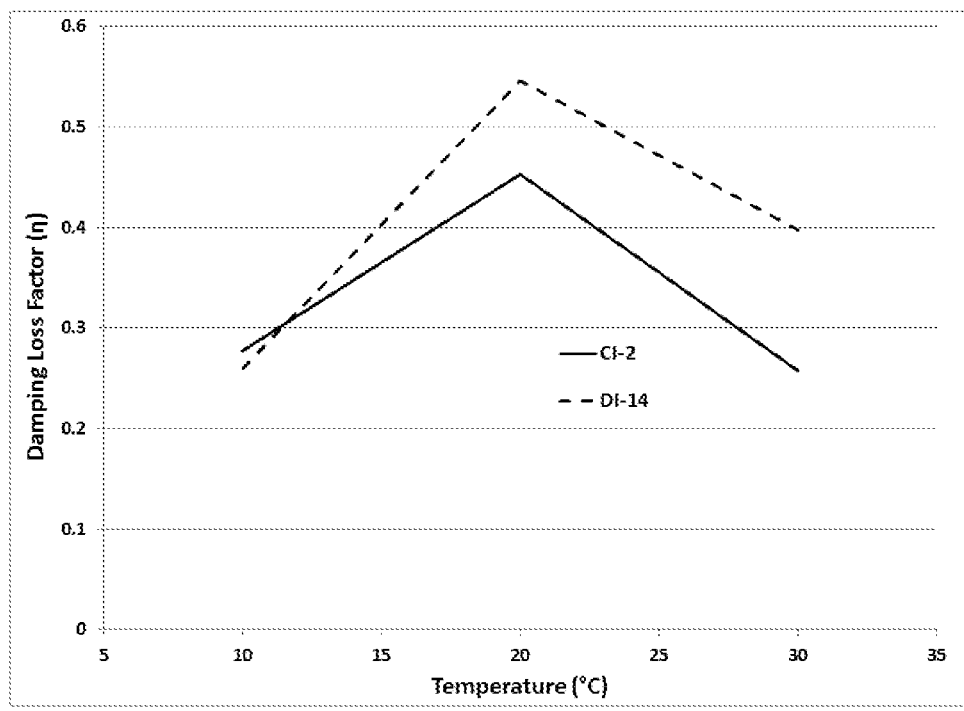
FIG. 2 is a chart showing the damping loss factor at 10° C., 20° C., and 30° C. for a disclosed interlayer (DI-14) and a comparative interlayer (CI-2).

FIG. 2 shows the damping loss factor at 10° C., 20° C., and 30° C. for a disclosed interlayer (DI-14) and a comparative interlayer (CI-2). The disclosed interlayer has a core layer containing a 50:50 blend of two resins: a first resin having a residual hydroxyl content of 9.6 wt. % and a second resin having a residual hydroxyl content of about 13 wt. %, and an average residual hydroxyl of 11.3 wt. %; and 70 phr plasticizer. The comparative interlayer has a core layer containing a single resin having a residual hydroxyl content of about 10.5 wt. % and 75 phr plasticizer. Both interlayers have a core layer thickness of 10 mils and a total interlayer thickness of 40 mils. The disclosed interlayer having two resins shows improved damping loss factor at both 20° C. and 30° C. while maintaining the damping loss factor at 10° C. (essentially unchanged compared to the comparative interlayer), thus providing sound insulation over a broader range of temperatures, and particularly at higher temperatures.

Figure 3:
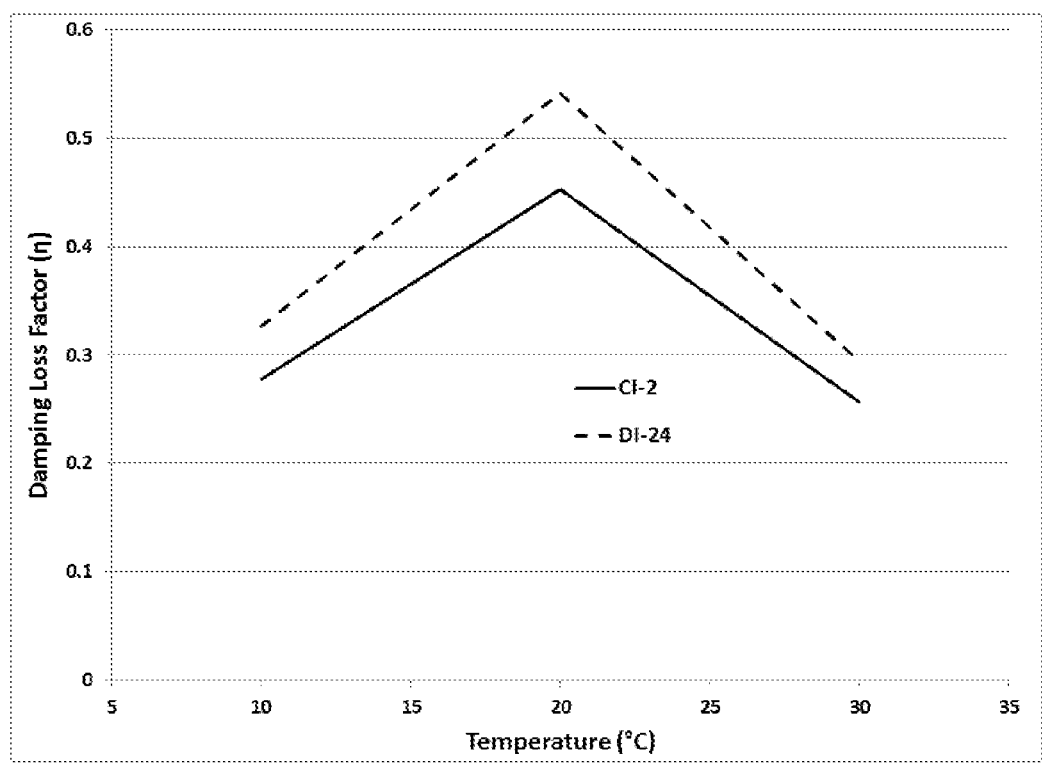
FIG. 3 is a chart showing the damping loss factor at 10° C., 20° C., and 30° C. for a disclosed interlayer (DI-24) and a comparative interlayer (CI-2).

FIG. 3 shows the damping loss factor at 10° C., 20° C., and 30° C. for a disclosed interlayer (DI-24) and a comparative interlayer (CI-2). The disclosed interlayer has a core layer containing a 75:25 blend of two resins: a first resin having a residual hydroxyl content of 9.6 wt. % and a second resin having a residual hydroxyl content of about 16.3 wt. %, and an average residual hydroxyl of 11.3 wt. %; and 75 phr plasticizer. The comparative interlayer has a core layer containing a single resin having a residual hydroxyl content of about 10.5 wt. % and 75 phr plasticizer. Both interlayers have a core layer thickness of 10 mils and a total interlayer thickness of 40 mils. The disclosed interlayer having two resins shows improved damping loss factor at all three temperatures, thus providing sound insulation over a broader range of temperatures.

FIGS. 1 to 3 illustrate that by formulating the core layer in a multiple layer interlayer to contain more than one resin, the sound insulation can be improved at lower temperatures, higher temperatures, or over a broader range of temperatures. To broaden the sound insulation performance over the temperature range of interest, the difference in the residual hydroxyl content is controlled to be more than about 3 wt. %; to broaden the performance on one side of the temperature range the difference in the residual hydroxyl content is selected to be less than about 3 wt. %. This difference in the residual hydroxyl content is also selected to affect the application temperature of glass panels comprising the interlayer of present disclosure.

As is known in the art, residual hydroxyl content can be controlled by controlling reaction times, reactant concentrations, and other variables in the manufacturing process. Examples of various embodiments of the residual hydroxyl content of the two (or more) layers are as follows: the resin in the skin layer is less than 25 wt. %, the first resin in the core layer is less than 22.5 wt. % and the second resin in the core layer is less than 24 wt. %; or the skin layer less than 23 wt. % and the two resins in the core layer are less than 20.5 wt. % and 22 wt. %, respectively; or the skin layer is less than 22 wt. % and the two resins in the core layer are less than 16 wt. % and 18 wt. %, respectively; or the skin layer is less than 22 wt. % and the two resins in the core layer are less than 12 wt. % and 15 wt. %, respectively; or the skin layer is less than 18 wt. % and the two resins in the core layer are less than 12 wt. % and 15 wt. %, respectively; or the skin layer is less than 15 wt. % and the two resins in the core layer are less than 10 wt. % and 12 wt. %, respectively. These are just examples of various embodiments, and one skilled in the art would understand that in any of these embodiments, any of the values given in the previous paragraphs for the difference in hydroxyl content between the resins in two (or more) layers can be used.

In various embodiments, the first PVB resin in the core layer comprises about 6 to about 22 weight percent (wt. %) hydroxyl groups calculated as % PVOH, about 8 to about 14 wt. %, about 10 to about 14 wt. %, and for certain embodiment, about 8 to about 12 wt. % hydroxyl groups calculated as % PVOH. In various embodiment, the resin can also comprise less than 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups.

In various embodiments, the second resin comprises about 6 to about 24 wt. %, about 7 to about 18 wt. %, about 8 to about 16 wt. %, and for certain embodiment, about 10 to about 14 wt. % hydroxyl groups calculated as % PVOH. In various embodiments, the resin can also comprise less than about 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups.

In various embodiments, the resin in the skin layer can comprise about 15 to about 35 wt. %, about 15 to about 30 wt. %, or about 17 to about 22 wt. %; and, for certain embodiments, about 17.5 to about 22.5 wt. % residual hydroxyl groups calculated as % PVOH. In various embodiments, the first resin and the second resin for the core layer, or the resin for the stiff layer(s), or any two of these resins, or all of the resins can also comprise less than 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde, a 2-ethyl hexanal acetal group, or a mix of any two of butyraldehyde acetal, isobutyraldehyde acetal group, and 2-ethyl hexanal acetal groups, as previously discussed.

The amount of the second resin relative to the first resin can vary in any range, as desired, such as from 1 to 99 wt. %, 2 to 98 wt. %, 3 to 97 wt. %, 4 to 96 wt. %, 5 to 95 wt. %, 10 to 90 wt. %, 15 to 85 wt. %, 20 to 80 wt. %, 25 to 75 wt. %, or about 50 wt. % of each in the core layer. The amount of the second resin may be any amount, from about 1 wt. % up to about 99 wt. %, depending on the desired properties. In certain embodiments, the amount of the second resin varies from about 25 to about 75 wt. %.

In various embodiments, the core layer comprises more than two resins. The differences in composition between any two of the resins can be any of the differences given above for the differences between the first resin and the second resin. For more than two resins, each resin can be included in amounts of at least 1 wt. % or more, or at least 2 wt. %, or at least 3 wt. %, or at least 4 wt. %, or at least 5 wt. % up to 98 wt %, depending on the desired properties of the polymer interlayer and the specific properties of the resins.

The amount of plasticizer in the interlayer can be adjusted to affect the glass transition temperature ($T_g$). In general, higher amounts of plasticizer loading will result in lower $T_g$. Because the plasticizer will partition such that there is more plasticizer in the polymer resin having the lower residual hydroxyl content and less plasticizer in the PVB resin having the higher residual hydroxyl content, the amount of plasticizer can be adjusted to shift the glass transition of the core layer and the temperature at which the interlayer exhibits optimum sound insulation property.

In various embodiments of present disclosure, the interlayer comprises greater than 5 phr, about 5 to about 120 phr, about 10 to about 90 phr, about 20 to about 70 phr, about 30 to about 60 phr, or less than 120 phr, or less than 90 phr, or less than 60 phr, or less than 40 phr, or less than 30 phr total plasticizer. The total plasticizer content in the interlayer is adjusted to affect the glass transitions of the core layer to optimize sound insulation property of the interlayer at a given application temperature range. The plasticizer content in the skin layer(s) or core layer(s) can be different from the total plasticizer content. In addition, the skin layer(s) and core layer(s) can have different plasticizer types and plasticizer contents, in the ranges discussed above, and as each respective layer's plasticizer content at the equilibrium state is determined by the layer's respective residual hydroxyl contents, as disclosed in U.S. Pat. No. 7,510,771 (the entire disclosure of which is incorporated herein by reference). For example, at equilibrium the interlayer could comprise two skin layers, each with 30 phr plasticizer, and a core layer with 65 phr plasticizer, for a total plasticizer amount for the interlayer of about 45.4 phr when the combined skin layer thickness equals that of the core layer. For thicker or thinner skin layers, the total plasticizer amount for the interlayer would change accordingly. In various embodiments of the present invention, the plasticizer content of the core layer and skin layer differs by at least 8 phr, or at least 9 phr, or at least 10 phr, or at least 12 phr, or at least 13 phr, or at least 14 phr, or at least 15 phr, or at least 16 phr, or at least 17 phr, or at least 18 phr, or at least 19 phr, or at least 20 phr, or at least 25 phr or more. As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the mix or melt that was used to produce the interlayer.

In various embodiments, the plasticizer is selected from conventional plasticizers, a mixture of two or more conventional plasticizers. In some embodiments, the conventional plasticizer, which has refractive index of less than about 1.450, may include, for example, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate, di(butoxyethyl) adipate, bis(2-(2-butoxyethoxy)ethyl) adipate, and mixtures thereof. In some embodiments, the conventional plasticizer is 3GEH (Refractive index=1.442 at 25° C.).

In some embodiments, other plasticizers known to one skilled in the art may be used, such as a plasticizer with a higher refractive index (i.e., a high refractive index plasticizer). As used herein, a "high refractive index plasticizer" is a plasticizer having a refractive index of at least about 1.460. As used herein, the refractive index (also known as index of refraction) of a plasticizer or a resin used in the entirety of this disclosure is either measured in accordance with ASTM D542 at a wavelength of 589 nm and 25° C. or reported in literature in accordance with ASTM D542. In various embodiments, the refractive index of the plasticizer is at least about 1.460, or greater than about 1.470, or greater than about 1.480, or greater than about 1.490, or greater than about 1.500, or greater than 1.510, or greater than 1.520, for both core and skin layers. In some embodiments, the high refractive index plasticizer(s) is used in conjunction with a conventional plasticizer, and in some embodiments, if included, the conventional plasticizer is 3GEH, and the refractive index of the plasticizer mixture is at least 1.460.

Examples of plasticizers having a high refractive index that may be used include, but are not limited to, polyadipates (RI of about 1.460 to about 1.485); epoxides (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). Examples of the high refractive index plasticizer include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof.

In embodiments having more than two layers, the polymer interlayer may comprise a second, or an additional skin layer (second skin layer) that is disposed in contact with the soft layer having the higher plasticizer content. Addition of this polymer layer results in a three layer construct that has the following structure: first skin layer//core layer//second skin layer. This second skin layer can have the same composition as the first skin layer, or it can be different.

In various embodiments, the second skin layer has the same composition as the first skin layer. In other embodiments, the second skin layer has a different composition than the first skin layer, and the differences in composition between the second skin layer and the core layer can be any of the differences given above for the differences between the first skin layer and the core layer. For example, one exemplary embodiment would be: first skin layer with a residual hydroxyl content of 20 wt. %//core layer with first resin having a residual hydroxyl content of 15.5 wt. % and second resin having a residual hydroxyl content of 17 wt. %//second skin layer with a residual hydroxyl content of 18 wt. %. It will be noted that, in this example, the skin layer differs from the first resin in the core layer at least in that it has a residual hydroxyl content that is 2.5 wt. % greater than the hydroxyl content of the first resin. Of course, any of the other differences noted herein throughout can singly or in combination distinguish the second skin layer from the core layer.

In addition to the two or three layer embodiments described herein, further embodiments include interlayers having more than three layers in which further layers having different residual hydroxyl layers can be used, for example, iterations of polymer layers having alternating plasticizer contents with alternating hydroxyl contents and optionally residual acetate content of 1 to 30 wt. %. Interlayers formed in such a manner can have, for example, 4, 5, 6, or up to 10 or more individual layers.

Generally, the thickness, or gauge, of the polymer interlayer will be in a range from about 0.25 mm to about 2.54 mm (about 10 mils to 100 mils), about 0.38 mm to about 1.52 mm (about 15 mils to 60 mils), about 0.51 to 1.27 mm (about 20 mils to about 50 mils), and about 0.38 to about 0.89 mm (about 15 mils to about 35 mils). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

The final interlayer, whether formed from extrusion or co-extrusion, generally has a random rough surface topography as it is formed through melt fractures of polymer melt as it exits the extrusion die and may additionally be embossed over the random rough surface on one or both sides (e.g., the skin layers) by any method of embossment known to one of ordinary skill in the art.

In various embodiments, the polymer can be any polymer suitable for use in a multiple layer panel. Typical polymers include, but are not limited to, polyvinyl acetals (PVA) (such as poly(vinyl butyral) (PVB) or poly(vinyl isobutyral), an isomer of poly(vinyl butyral) and also referred as PVB, aliphatic polyurethane (PU), poly(ethylene-co-vinyl acetate) (EVA), polyvinylchloride (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB and its isomer polyvinyl isobutyral, polyvinyl chloride, ionomers, and polyurethane are suitable polymers generally for interlayers; PVB and its isomer are particularly suitable. Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inc. of Woburn, Mass.). EVA polymers (or copolymers) can contain various amounts of vinyl acetate groups. The desirable vinyl acetate content is generally from about 10 to about 90 mol %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont of Wilmington, Del.).

Examples of exemplary multilayer interlayer constructs include, but are not limited to, PVB//PVisoB//PVB, where PVisoB layer comprises two or more resins having different residual hydroxyl contents or different polymer compositions; PVC//PVB//PVC, PU//PVB//PU, Ionomer//PVB//Ionomer, Ionomer//PU//Ionomer, Ionomer//EVA//Ionomer, where the core layer PVB (including PVisoB), PU or EVA comprises two or more resins having different glass transitions. Alternatively, the skin and core layers may all be PVB using the same or different starting resins. Other combinations of resins and polymers will be apparent to those skilled in the art.

The sound insulation effect over a broad temperature range that is characteristic of the multilayer interlayers disclosed herein is achieved in a single polymer interlayer through the use of co-extrusion processes. For each interlayer embodiment of the present invention in which two or more separate polymer layers are disposed in contact with one another and subsequently laminated into a single interlayer, there also exists an embodiment where a coextruded polymer sheet has two or more distinct layers corresponding to the individual layers in a laminated interlayer of the present invention. Further, for each of the multiple layer glass panels, methods of producing interlayers, and methods of producing multiple layer glass panels of the present invention in which separate polymer layers are laminated together, there is also an analogous embodiment employing a coextruded polymer layers in place of the multiple layer interlayer.

The present invention also includes methods of manufacturing an interlayer, comprising the steps of forming a first polymer layer and a second polymer layer comprising two or more resins of different compositions, wherein the two polymer layers have different compositions, as described herein, and laminating the two polymer sheets together to form the interlayer.

The present invention also includes methods of manufacturing an interlayer, comprising the steps of forming a first polymer layer, a second polymer layer comprising two or more resins of different compositions, and a third polymer layer, wherein the three polymer layers have compositions according to the three layer embodiments as described herein, and laminating the three polymer layers together to form the interlayer.

The present invention also includes the interlayers comprising various adhesion control agents ("ACAs"). Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

The present invention also includes additives to impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The present invention also includes a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass) II (polymer interlayer sheet) II (polymer film), where the polymer interlayer sheet can comprise multiple interlayers, as noted above.

The present invention also includes methods of manufacturing a multiple layer glazing, comprising laminating any of the interlayers of the present invention between two rigid, transparent panels, as are known in the art, such as glass or acrylic layers.

The present invention also includes multiple layer glass panels, such as windshields and architectural windows, comprising a multilayer interlayer of the present invention. Also included are multiple layer glazing panels having plastics, such as acrylics, or other suitable materials in place of the glass panels.

These examples of multiple layer panels are in no way meant to be limiting, as one of ordinary skill in the art would readily recognize that numerous constructs other than those described above could be made with the interlayers of the present disclosure.

Clarity is a parameter used to describe the polymer interlayers disclosed herein. Clarity is determined by measuring the haze value or percent haze. The test for percent haze is performed with a hazemeter, such as Model D25 available from Hunter Associates (Reston, Va.), and in accordance with ASTM D1003-61 (Re-approved 1977)-Procedure A using Illuminant C, at an observer angle of 2 degrees. The polymer interlayers are laminated with a pair of clear glass sheets each of 2.3 mm thick (commercially available from Pittsburgh Glass Works of Pennsylvania) and the haze values are measured. The interlayers of the present disclosure have a percent haze of less than about 5%, less than about 4%, less than about 3%, less than about 2%, less than about 1%, or less than about 0.5%.

Transparency, or percent visual transmittance (% $T_{vis}$) is also used to describe the polymer interlayers disclosed herein. The transparency is measured with a hazemeter, such as Model D25 available from Hunter Associates (Reston, Va.), and in Illuminant D65, at an observer angle of 10 degrees. The polymer interlayers are laminated with a pair of clear glass sheets each of 2.3 mm thick (commercially available from Pittsburgh Glass Works of Pennsylvania) and the % $T_{vis}$ are measured. The polymer interlayers of the present disclosure have a % $T_{vis}$ of greater than 85 for the interlayers containing only additives of ACAs, UV stabilizers, and antioxidant, or greater than 80% for the interlayers containing additional additives such as pigments, IR absorbers or blockers as mentioned above. Polymer interlayers containing high levels of pigments and/or dyes may have lower % $T_{vis}$ values as desired, such as in mass pigmented or colored polymer interlayers.

The refractive index (RI) was measured in accordance with ASTM D542. The reported RI values are obtained at a wavelength of 589 nm and at 25° C.

The sound insulation property, such as Sound Transmission Loss, of a glass panel comprising interlayer of the present invention is evaluated by the damping loss factor value obtained from vibration measurements. Sound transmission loss of a glass panel correlates with damping loss factor of the panel (see, for example, Lu, J: "Designing PVB Interlayer for Laminated Glass with Enhanced Sound Reduction", 2002, InterNoise 2002, paper 582). The damping loss factor (η) was measured by Mechanical Impedance Measurement as described in ISO 16940. A laminated glass bar sample of 25 mm wide, 300 mm long, and having a pair of 2.3 mm clear glass is prepared and excited at the center point of the bar by a vibration shaker (Brüel and Kjær). An impedance head (Brüel and Kjær) is used to measure the force to excite the bar to vibrate and the velocity of the vibration and the resultant transfer function is recorded on a National Instrument data acquisition and analysis system. The damping loss factor at the first vibration mode is calculated using the half-power method. Higher damping loss factor means better sound insulation performance.

The invention also includes Embodiments 1 to 12, as set forth below.

Embodiment 1 is a polymer interlayer having improved sound insulation, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent; wherein the difference between the first glass transition temperature ($T_g$) the second glass transition temperature ($T_g$) is at least 1.5° C.; and a plasticizer; at least one stiffer layer comprising a third poly(vinyl butyral) resin having a third residual hydroxyl content; and a plasticizer, wherein the polymer interlayer has a damping loss factor (η) (as measured by Mechanical Impedance Measurement according to ISO 16940) of at least about 0.16 measured at two or more different temperatures selected from 10° C., 20° C. and 30° C.

Embodiment 2 is polymer interlayer having improved sound insulation, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent, wherein the difference between the first glass transition temperature ($T_g$) and the second glass transition temperature ($T_g$) is at least 1.5° C.; and a plasticizer; at least one stiffer layer comprising a third poly(vinyl butyral) resin having a third residual hydroxyl content; and a plasticizer, wherein each plasticized resin in the soft layer of the polymer interlayer has a glass transition temperature ($T_g$) less than 20.0° C.

Embodiment 3 is a polymer interlayer having improved sound insulation, the polymer interlayer comprising: at least one soft layer wherein the soft layer comprises: a first poly(vinyl butyral) resin having a first residual hydroxyl content and a first glass transition temperature ($T_g$); a second poly(vinyl butyral) resin having a second residual hydroxyl content and a second glass transition temperature ($T_g$), wherein the difference between the first residual hydroxyl content and the second residual hydroxyl content is at least 1.0 weight percent; wherein the difference between the first glass transition temperature ($T_g$) the second glass transition temperature ($T_g$) is at least 1.5° C.; and a plasticizer; at least one stiffer layer comprising a third poly(vinyl butyral resin) having a third residual hydroxyl content; and a plasticizer, wherein the polymer interlayer has a damping loss factor (η) (as measured by Mechanical Impedance Measurement according to ISO 16940) of at least about 0.16 measured at two or more different temperatures selected from 10° C., 20° C. and 30° C., and wherein the second poly(vinyl butyral) resin is present in an amount of from about 5 weight percent to about 50 weight percent.

Embodiment 4 is a polymer interlayer including any of the features of embodiments 1 to 2, wherein the second poly(vinyl butyral) resin is present in an amount of from about 5 weight percent to about 50 weight percent.

Embodiment 5 is a polymer interlayer including any of the features of embodiments 1 to 4, wherein the second poly(vinyl butyral) resin is present in an amount of from about 25 weight percent to about 50 weight percent.

Embodiment 6 is a polymer interlayer including any of the features of embodiments 1 or 3, wherein each plasticized resin in the soft layer of the polymer interlayer has a glass transition temperature ($T_g$) less than 20.0° C.

Embodiment 7 is a polymer interlayer including any of the features of embodiments 1 to 6, wherein the residual hydroxyl content of the third poly(vinyl butyral) resin is the same as the residual hydroxyl content of the first poly(vinyl butyral) resin or the second poly(vinyl butyral) resin).

Embodiment 8 is a polymer interlayer including any of the features of embodiments 1 to 7, wherein the difference between the first residual hydroxyl content and the second residual hydroxyl content is at least 2.0 weight percent.

Embodiment 9 is a polymer interlayer including any of the features of embodiments 1 to 8, wherein the difference between the first residual hydroxyl content and the second residual hydroxyl content is at least 3.0 weight percent Embodiment 10 is a polymer interlayer including any of the features of embodiments 1 to 9, wherein the difference between the glass transition temperatures ($T_g$) of the first poly(vinyl butyral) resin and the second poly(vinyl butyral) resin is at least 3.0° C.

Embodiment 11 is a multiple layer glass panel including the polymer interlayer of any of embodiments 1 to 10.

Embodiment 12 is a multiple layer glass panel comprising: a first glass panel; a polymer interlayer including any of the features of embodiments 1 to 10, a second glass panel, wherein the polymer interlayer is disposed between the first and second glass panels.

EXAMPLES

Exemplary core layers of the present disclosure (designated as "Disclosed Layers" and as shown as DL 1-16 in the Tables below) and comparative core layers (designated as "Comparative Layers" and as shown as CL 1-3 in the Tables below) were produced by mixing and melt-extruding 100 parts poly(vinyl butyral) resin(s) and various amounts of 3GEH plasticizer, and other common additives (as described above), as shown below. For the Disclosed Layers, the types and amounts (ratio) of the two resins is also shown. The core layers were then used to construct various multilayered interlayers as shown in the Tables and as described more fully below. The skin layers each had a thickness of 15 mils in the multilayer interlayers (CI-1 to CI-4 and DI-1 to DI-26) and contain 100 parts poly(vinyl butyral) resin having a residual hydroxyl content of about 19 wt. % and a residual acetate content of 2%, and 38 parts 3GEH plasticizer, and other common additives (as described above). The multilayer interlayers all have the construction: Skin layer//Core layer//Skin layer.

The improved sound damping properties of a multilayer interlayer can be most readily appreciated by a comparison of multilayer (tri-layer) interlayers having a blend of two resins of different residual hydroxyl contents and different glass transition temperatures and at least one plasticizer in the core layer (designated as "Disclosed Interlayers") to a multilayer interlayer having a core layer formed from only a single resin (of a fixed residual hydroxyl content) and at least one plasticizer in the core layer (designated as "Comparative Interlayers"). The Comparative Interlayers are shown as CI-1 to CI-4, and the Disclosed Interlayers are shown as DI-1 to DI-26 in the Tables. These Examples demonstrate that the sound damping properties can be improved and achieved over a range of temperatures when at least two PVB resins having differing residual hydroxyl contents and glass transition temperatures are used in the core layer, such as when a second PVB resin having a higher residual hydroxyl content and different glass transition temperature is added to (or combined with) a first PVB resin having a lower residual hydroxyl level the core layer.

The resins used in the Tables below are PVB resins having residual hydroxyl contents and vinyl acetate residues as follows:

Resin-A: about 10.5 wt. % residual hydroxyl content and a vinyl acetate residue of 2%.

Resin-B: about 9.6 wt. % residual hydroxyl content and a vinyl acetate residue of 2%.

Resin-C: about 13 wt. % residual hydroxyl content and a vinyl acetate residue of 2%.

Resin-D: about 16.3 wt. % residual hydroxyl content and a vinyl acetate residue of 2%.

Resin-E: about 11.5 wt. % residual hydroxyl content and a vinyl acetate residue of 2%.

In the Tables below, core layers constructed from different combinations of two resins having different residual hydroxyl contents and glass transition temperatures are compared to core layers comprising only one resin at a fixed residual hydroxyl content. Glass transition temperatures of the plasticized first and second resins as well as the observed glass transition temperatures and damping loss factors are shown in the Tables below.

TABLE 1

| | | | | Core layer | | | | | | | | | |
|---|---|---|---|---|---|---|---|---|---|---|---|---|---|
| Inter- layer No | Core layer no. | PVB resin(s) Used | Ratio of B/E | First resin residual hydroxyl content (wt. %) | Second resin residual hydroxyl content (wt. %) | Average residual hydroxyl content (wt. %) | Plasticizer content (phr) | thickness (mil) | Glass transition temperatures of individual plasticized resins (° C.) | | Observed Core layer glass transition temperatures (° C.) | Damping loss factor (η) at temperature (° C.) | | |
| | | | | | | | | | First $T_{g1}$ | Second $T_{g2}$ | $T_{g1}$ | 10 | 20 | 30 |
| CI-1 | CL-1 | A | — | 10.5 | — | 10.5 | 75 | 5 | −2.5 | — | −2.5 | 0.27 | 0.44 | 0.27 |
| DI-1 | DL-1 | B, E | 50/50 | 9.6 | 11.5 | 10.5 | 75 | 5 | −4.5 | 1.9 | 0.2 | 0.34 | 0.50 | 0.24 |
| DI-2 | DL-2 | B, E | 50/50 | 9.6 | 11.5 | 10.5 | 70 | 5 | −2.2 | 3.7 | 1.4 | 0.39 | 0.54 | 0.27 |
| DI-3 | DL-3 | B, E | 50/50 | 9.6 | 11.5 | 10.5 | 65 | 5 | 0.4 | 5.8 | 3.4 | 0.21 | 0.52 | 0.34 |
| DI-4 | DL-4 | B, E | 50/50 | 9.6 | 11.5 | 10.5 | 60 | 5 | 3 | 8.1 | 6.2 | 0.20 | 0.51 | 0.36 |
| CI-2 | CL-1 | A | — | 10.5 | — | 10.5 | 75 | 10 | −2.5 | — | −2.5 | 0.28 | 0.45 | 0.26 |
| DI-5 | DL-1 | B, E | 50/50 | 9.6 | 11.5 | 10.5 | 75 | 10 | −4.5 | 1.9 | 0.2 | 0.42 | 0.50 | 0.25 |
| DI-6 | DL-2 | B, E | 50/50 | 9.6 | 11.5 | 10.5 | 70 | 10 | −2.2 | 3.7 | 1.4 | 0.37 | 0.54 | 0.25 |
| DI-7 | DL-3 | B, E | 50/50 | 9.6 | 11.5 | 10.5 | 65 | 10 | 0.4 | 5.8 | 3.4 | 0.31 | 0.56 | 0.28 |
| DI-8 | DL-4 | B, E | 50/50 | 9.6 | 11.5 | 10.5 | 60 | 10 | 3 | 8.1 | 6.2 | 0.27 | 0.62 | 0.34 |

Table 1 compares interlayers having comparative core layers formed from one resin having a residual hydroxyl content of about 10.5 wt. % with disclosed core layers comprising two resins at a resin ratio of 50:50, with an average residual hydroxyl content of about 10.5 wt. %, and a delta residual hydroxyl content of about 1.9 wt. %. Core layers were formed in two thicknesses, 5 mils and 10 mils, and at varying plasticizer levels of from 60 phr to 75 phr. Glass transition temperatures for the individual plasticized resins are shown, as well as the observed glass transition temperature of the core layer. Since the individual glass transition temperatures do not differ by a large amount, only one glass transition temperature was seen and measured on the core layer, which is between the two individual glass transition temperatures.

Damping loss factor was measured on all the interlayers, as shown in Table 1. For the 5 mils core layers, at plasticizer levels of 70 and 75 phr, damping loss factors are higher at 10° C. and 20° C. and essentially unchanged at 30° C. when compared to that of the control sample. For the 10 mils core layers, the same but more pronounced trends were observed. At plasticizer levels of 65, 70 and 75 phr, damping loss factors are higher at 10° C. and 20° C. and essentially unchanged at 30° C. At 60 phr, the damping loss factor increased at 20° C. and 30° C. and remained unchanged at 10° C.

These examples illustrate the benefit of incorporating two resins of different residual hydroxyl contents (9.6 and 11.5 wt. %, respectively) in the core layer with the average residual hydroxyl content level equal to the residual hydroxyl level of the single resin of the control sample, the sound insulation property of the multilayer interlayer is improved and broadened in the temperature range of 10° C. to 30° C. By modulating the amount of plasticizer in the core, the sound insulation property can be improved at either higher or lower temperature end. This is clearly illustrated by comparing the control interlayer, CI-1, where the damping loss factor is maximized at 20° C. (and it decreases at both 10° C. and 30° C.) with the disclosed interlayers, such as DI-1 and DI-2, where the damping loss factor is also maximized at 20° C. but also increases at 10° C. and remains almost unchanged at 30° C. For the disclosed interlayers, DI-3 and DI-4, the damping loss factor is also maximized at 20° C. but also increases at 30° C. Comparing CI-2 with DI-5, DI-6 and DI-7 shows a similar trend, where the damping loss factor is maximized at 20° C. (and it decreases at both 10° C. and 30° C.) for the control sample while the damping loss factor is also maximized at 20° C. but also increases at 10° C. and remains almost unchanged at 30° C. for the disclosed interlayers. For the disclosed interlayer, DI-8, the damping loss factor is also maximized at 20° C. but also increases at 30° C. while remaining essentially unchanged at 10° C., providing better sound insulation over a broader range of temperatures.

core layer. Since the individual glass transition temperatures do not differ by a large amount, only one glass transition temperature is measured on the core layer, which is between the two individual glass transition temperatures.

Damping loss factor was measured on all the interlayers, as shown in Table 2. For the 5 mils core layers, at plasticizer levels of 60, 65, 70 and 75 phr, damping loss factor is lower than that of the control sample at 10° C. and 20° C. and higher at 30° C. The lower damping loss factors at 10° C. and 20° C. are due to higher average residual hydroxyl content of 11.3 (vs. 10.5 for the control) and the core layer thickness of 5 mils. When the core layer thickness is increased from 5 mils to 10 mils, there is a significant increase in damping loss factor at 10° C. and 20° C. At a plasticizer level of 75 phr, the damping loss factor of the disclosed interlayers is better than that of the control or comparative interlayers at all three temperatures. When reducing the plasticizer level to 70 phr or 60 phr, there is a reduction in damping loss factor at 10° C., but the damping loss factor improves further at both 20° C. and 30° C. Therefore, even with higher averaging residual hydroxyl content in the core layer, the sound insulation of the interlayers can be improved over a broader temperature range by increasing the core layer thickness.

This is clearly illustrated by comparing the control interlayer, CI-1, where the damping loss factor is maximized at 20° C. (and it decreases at both 10° C. and 30° C.) with the disclosed interlayers, such as DI-9, DI-10, DI-11 and DI-12,

TABLE 2

| | | | | | | | | | Core layer | | | | | |
|---|---|---|---|---|---|---|---|---|---|---|---|---|---|---|
| Inter-layer No | Core layer no. | PVB resin(s) Used | Ratio of B/C | First resin residual hydroxyl content (wt. %) | Second resin residual hydroxyl content (wt. %) | Average residual hydroxyl content (wt. %) | Plasticizer content (phr) | thickness (mil) | Glass transition temperatures of individual plasticized resins (° C.) | | Observed Core layer glass transition temperatures (° C.) | Damping loss factor ($\eta$) at temperature (° C.) | | |
| | | | | | | | | | First $T_{g1}$ | Second $T_{g2}$ | $T_{g1}$ | 10 | 20 | 30 |
| CI-1 | CL-1 | A | — | 10.5 | — | 10.5 | 75 | 5 | −2 | — | −2.5 | 0.27 | 0.44 | 0.27 |
| DI-9 | DL-5 | B, C | 50/50 | 9.6 | 13 | 11.3 | 75 | 5 | −4.5 | 4.9 | −1.0 | 0.17 | 0.40 | 0.34 |
| DI-10 | DL-6 | B, C | 50/50 | 9.6 | 13 | 11.3 | 70 | 5 | −2.2 | 6.7 | 1.0 | 0.14 | 0.34 | 0.33 |
| DI-11 | DL-7 | B, C | 50/50 | 9.6 | 13 | 11.3 | 65 | 5 | 0.4 | 8.7 | 3.8 | 0.10 | 0.33 | 0.40 |
| DI-12 | DL-8 | B, C | 50/50 | 9.6 | 13 | 11.3 | 60 | 5 | 3 | 10.3 | 6.3 | 0.12 | 0.36 | 0.40 |
| CI-2 | CL-1 | A | — | 10.5 | — | 10.5 | 75 | 10 | −2 | — | −2.5 | 0.28 | 0.45 | 0.26 |
| DI-13 | DL-5 | B, C | 50/50 | 9.6 | 13 | 11.3 | 75 | 10 | −4.5 | 4.9 | −1.0 | 0.34 | 0.49 | 0.28 |
| DI-14 | DL-6 | B, C | 50/50 | 9.6 | 13 | 11.3 | 70 | 10 | −2.2 | 6.7 | 1.0 | 0.25 | 0.55 | 0.40 |
| DI-15 | DL-7 | B, C | 50/50 | 9.6 | 13 | 11.3 | 65 | 10 | 0.4 | 8.7 | 3.8 | 0.21 | 0.55 | 0.41 |
| DI-16 | DL-8 | B, C | 50/50 | 9.6 | 13 | 11.3 | 60 | 10 | 3 | 10.3 | 6.3 | 0.15 | 0.47 | 0.42 |

Table 2 compares interlayers having comparative core layers with a residual hydroxyl content of about 10.5 wt. % with disclosed core layers comprising two resins with an average residual hydroxyl content of about 11.3 wt. %, and a delta residual hydroxyl content of about 3.4 wt. %. Core layers were formed in two thicknesses, 5 mils and 10 mils, and at varying plasticizer levels of from 60 phr to 75 phr. Glass transition temperatures for the individual plasticized resins are shown, as well as the glass transition temperature of the where the damping loss factor is also maximized at 20° C. but also increases at 30° C. The same trend is shown when comparing the core layers at the thickness of 10 mils, where for CI-2, the damping loss factor is maximized at 20° C. (and it decreases at both 10° C. and 30° C.), but for DI-13, DI-14, DI-15 and DI-16, the damping loss factor is also maximized at 20° C. but also increases at 30° C., providing better sound insulation over a broader range of temperatures. For DI-13, DI-14 and DI-15, the damping loss factor at 10° C. is still at least 0.20.

TABLE 3

| Inter-layer No | Core layer no. | PVB resin(s) Used | Ratio of B/D | First resin residual hydroxyl content (wt. %) | Second resin residual hydroxyl content (wt. %) | Average residual hydroxyl content (wt. %) | Plasticizer content (phr) | thickness (mil) | Glass transition temperatures of individual plasticized resins (° C.) First $T_{g1}$ | Glass transition temperatures of individual plasticized resins (° C.) Second $T_{g2}$ | Observed Core layer glass transition temperatures (° C.) First $T_{g1}$ | Observed Core layer glass transition temperatures (° C.) Second $T_{g2}$ | Damping loss factor ($\eta$) at temperature (° C.) 10 | Damping loss factor ($\eta$) at temperature (° C.) 20 | Damping loss factor ($\eta$) at temperature (° C.) 30 |
|---|---|---|---|---|---|---|---|---|---|---|---|---|---|---|---|
| CI-3 | CL-2 | C | | 13 | | 13 | 65 | 5 | 8.7 | — | 8.7 | — | 0.06 | 0.24 | 0.45 |
| CI-4 | CL-3 | C | | 13 | | 13 | 60 | 5 | 10.3 | — | 10.3 | — | 0.05 | 0.21 | 0.43 |
| DI-17 | DL-9 | B, D | 50/50 | 9.6 | 16.3 | 13 | 65 | 5 | 0.4 | 12.3 | −3.4 | 14 | 0.08 | 0.27 | 0.49 |
| DI-18 | DL-10 | B, D | 50/50 | 9.6 | 16.3 | 13 | 60 | 5 | 3 | 14.5 | −1 | 15.9 | 0.06 | 0.18 | 0.41 |
| DI-19 | DL-9 | B, D | 50/50 | 9.6 | 16.3 | 13 | 65 | 10 | 0.4 | 12.3 | −3.4 | 14 | 0.20 | 0.47 | 0.39 |
| DI-20 | DL-10 | B, D | 50/50 | 9.6 | 16.3 | 13 | 60 | 10 | 3 | 14.5 | −1 | 15.9 | 0.15 | 0.42 | 0.41 |

Table 3 compares interlayers having comparative core layers with a residual hydroxyl content of about 13 wt. % with disclosed core layers comprising two resins with an average residual hydroxyl content of about 13 wt. %, and a delta residual hydroxyl content of about 6.7 wt. %. Core layers were formed in two thicknesses, 5 mils and 10 mils, and at varying plasticizer levels of 60 phr and 65 phr. Glass transition temperatures for the individual plasticized resins are shown, as well as the glass transition temperatures of the core layer. At the higher delta residual hydroxyl level, the two different glass transition temperatures are measurable in the Disclosed Interlayers since there is a larger difference between the two temperatures.

Damping loss factor was measured on all the interlayers, as shown in Table 3. For the 5 mils core layers, at all plasticizer levels, damping loss factor is similar to that of the control samples at all three temperatures. For the 10 mils core layers, at all plasticizer levels, damping loss factor is significantly higher at 10° C. and 20° C. and slightly lower at 30° C. When there is a larger difference in residual hydroxyl content between the two resins, the sound insulation can be improved at lower temperatures by increasing the core layer thickness.

Table 4 compares interlayers having comparative core layers with a residual hydroxyl content of about 10.5 wt. % with disclosed core layers comprising two resins with an average residual hydroxyl content of about 10.5 wt. % and 11.3 wt. %. Compare disclosed interlayers DI-5, DI-6 and DI-7 to DI-21, DI-22 and DI-23, which have the same average residual hydroxyl contents. The average residual hydroxyl content of about 10.5 wt. % was obtained by blending two resins (Resin-B at 9.6 wt. % and Resin-E at 11.5 wt. % residual hydroxyl content, respectively, with a delta residual hydroxyl content of 1.9 wt. %) at a ratio 50:50. This same average residual hydroxyl content of about 10.5 wt. % was also be obtained by blending two different resins (Resin-B at 9.6 wt. % and Resin-C at 13 wt. % residual hydroxyl content, respectively, with a delta residual hydroxyl content of 3.4 wt. %) at a ratio of 75:25. Compare disclosed interlayers DI-13, DI-14 and DI-15 to DI-24, DI-25 and DI-26, which have the same average residual hydroxyl contents. The average residual hydroxyl content of about 11.3 wt. % was obtained by blending two resins (Resin-B at 9.6 wt. % and Resin-C at 13 wt. % residual hydroxyl content, respectively, with a delta residual hydroxyl content of 3.4 wt. %) at a ratio 50:50. This same

TABLE 4

| Inter-layer No | Core layer no. | PVB resin(s) Used | Ratio of First/Second resin | First resin residual hydroxyl content (wt. %) | Second resin residual hydroxyl content (wt. %) | Average residual hydroxyl content (wt. %) | Plasticizer content (phr) | thickness (mil) | Glass transition temperatures of individual plasticized resins (° C.) First $T_{g1}$ | Glass transition temperatures of individual plasticized resins (° C.) Second $T_{g2}$ | Observed Core layer glass transition temperatures (° C.) First $T_{g1}$ | Observed Core layer glass transition temperatures (° C.) Second $T_{g2}$ | Damping loss factor ($\eta$) at temperature (° C.) 10 | Damping loss factor ($\eta$) at temperature (° C.) 20 | Damping loss factor ($\eta$) at temperature (° C.) 30 |
|---|---|---|---|---|---|---|---|---|---|---|---|---|---|---|---|
| CI-2 | CL-1 | A | — | 10.5 | — | 10.5 | 75 | 10 | −2 | — | −2.5 | — | 0.28 | 0.45 | 0.26 |
| DI-5 | DL-1 | B, E | 50/50 | 9.6 | 11.5 | 10.5 | 75 | 10 | −4.5 | 1.9 | 0.2 | — | 0.42 | 0.50 | 0.25 |
| DI-6 | DL-2 | B, E | 50/50 | 9.6 | 11.5 | 10.5 | 70 | 10 | −2.2 | 3.7 | 1.4 | — | 0.37 | 0.54 | 0.25 |
| DI-7 | DL-3 | B, E | 50/50 | 9.6 | 11.5 | 10.5 | 65 | 10 | 0.4 | 5.8 | 3.4 | — | 0.31 | 0.56 | 0.28 |
| DI-21 | DL-11 | B, C | 75/25 | 9.6 | 13 | 10.5 | 75 | 10 | −4.5 | 4.9 | −3.7 | — | 0.38 | 0.49 | 0.27 |
| DI-22 | DL-12 | B, C | 75/25 | 9.6 | 13 | 10.5 | 70 | 10 | −2.2 | 6.7 | −2.3 | — | 0.33 | 0.54 | 0.29 |
| DI-23 | DL-13 | B, C | 75/25 | 9.6 | 13 | 10.5 | 65 | 10 | 0.4 | 8.7 | 0.4 | — | — | — | — |
| DI-13 | DL-5 | B, C | 50/50 | 9.6 | 13 | 11.3 | 75 | 10 | −4.5 | 4.9 | −1 | — | 0.34 | 0.49 | 0.28 |
| DI-14 | DL-6 | B, C | 50/50 | 9.6 | 13 | 11.3 | 70 | 10 | −2.2 | 6.7 | 1 | — | 0.26 | 0.55 | 0.40 |
| DI-15 | DL-7 | B, C | 50/50 | 9.6 | 13 | 11.3 | 65 | 10 | 0.4 | 8.7 | 3.8 | — | 0.21 | 0.55 | 0.41 |
| DI-24 | DL-14 | B, D | 75/25 | 9.6 | 16.3 | 11.3 | 75 | 10 | −4.5 | 9.5 | −5.0 | 24 | 0.33 | 0.44 | 0.32 |
| DI-25 | DL-15 | B, D | 75/25 | 9.6 | 16.3 | 11.3 | 70 | 10 | −2.2 | 10.7 | −2.7 | 25.8 | 0.27 | 0.42 | 0.31 |
| DI-26 | DL-16 | B, D | 75/25 | 9.6 | 16.3 | 11.3 | 65 | 10 | 0.4 | 12.3 | 0 | 27.1 | 0.26 | 0.46 | 0.33 | average residual hydroxyl content of about 11.3 wt. % was also be obtained by blending two different resins (Resin-B at 9.6 wt. % and Resin-D at 16.3 wt. % residual hydroxyl content, respectively, with a delta residual hydroxyl content of 6.7 wt. %) at a ratio of 75:25.

Core layers were formed at a thickness of 10 mils and at varying plasticizer levels of from 65 phr to 75 phr. Glass transition temperatures for the individual plasticized resins are shown, as well as the glass transition temperature(s) of the core layer. In some cases, since the individual glass transition temperatures do not differ by a large amount or the glass transition peak of the second plasticized resin is weak due to the presence of the resin at a smaller amount, only one glass transition temperature is measured on the core layer, which is between the two individual glass transition temperatures.

At the average residual hydroxyl content of about 10.5 wt. %, when the difference in residual hydroxyl content between the first and second resin is smaller (1.9 wt. %), damping loss factor is improved at 10 and 20° C. for 5 mils core layer (DI-5 to DI-7); increasing the difference from 1.9% to 3.4%, e.g., increasing the residual hydroxyl of the second resin from 11.5% to 13%, results in a more balanced increase in damping loss factor at all three temperature (DI-21 to DI-22). At the average residual hydroxyl content of about 11.3 wt. % and the difference in residual hydroxyl content between the first and second resin of 3.4 wt. %, damping loss factor is improved at 20 and 30° C. (DI-13 to DI-15); increasing the difference from 3.4% to 6.7%, e.g., increasing the residual hydroxyl of the second resin from 13% to 16.3%, results in an increase in damping loss factor at 30° C. (DI-25 and DI-26) at plasticizer levels of 65 and 70 and a more balanced increase at all three temperatures (DI-24).

This is clearly illustrated by comparing the control interlayer, CI-2, where the damping loss factor is maximized at 20° C. (and it decreases at both 10° C. and 30° C.) with the disclosed interlayers, such as DI-5, DI-6, DI-7, DI-21 and DI-22, where the damping loss factor is also maximized at 20° C. but also increases at 10° C. and remains essentially unchanged compared to the control interlayer at 30° C. Comparing the control interlayer, CI-2, with the disclosed interlayers DI-13, DI-14, DI-15, DI-24, DI-25 and DI-26, the damping loss factor is also maximized at 20° C. but also increases at 30° C. and drops slightly in some cases and remains essentially unchanged in others compared to the control interlayer at 10° C. This shows that interlayers having two resins having different hydroxyl contents in different ratios can be combined to provide better sound insulation over a broader range of temperatures.

In conclusion, the multilayered interlayers with core layers described herein have numerous advantages over conventional multilayered interlayers previously utilized in the art. In general, in comparison to multilayered interlayers previously utilized in the art, the multilayered interlayers comprising core layers as described herein, having two (or more) different resins having different hydroxyl contents and glass transition temperatures, have an improved sound insulation performance and broaden the temperature range at which the interlayers perform. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:

1. A polymer interlayer having improved sound insulation, the polymer interlayer comprising:
    at least one soft layer wherein the soft layer comprises a blend of two or more poly(vinyl butyral) resins comprising:
    a first poly(vinyl butyral) resin having a first residual hydroxyl content and a first glass transition temperature ($T_g$);
    a second poly(vinyl butyral) resin having a second residual hydroxyl content and a second glass transition temperature ($T_g$),
    wherein the difference between the first residual hydroxyl content and the second residual hydroxyl content is at least 1.0 weight percent;
    wherein the difference between the first glass transition temperature ($T_g$) and the second glass transition temperature ($T_g$) is at least 1.5° C.; and
    a plasticizer, wherein the first poly(vinyl butyral) resin, the second poly(vinyl butyral) resin and the plasticizer are mixed and melt-extruded to form the at least one soft layer;
    at least one stiffer layer comprising a third poly(vinyl butyral) resin having a third residual hydroxyl content; and
    a plasticizer,
    wherein the polymer interlayer has a damping loss factor ($\eta$) (as measured by Mechanical Impedance Measurement according to ISO 16940) of at least about 0.16 measured at two or more different temperatures selected from 10° C., 20° C. and 30° C.

2. The polymer interlayer of claim 1, wherein the second poly(vinyl butyral) resin is present in an amount of from about 5 weight percent to about 50 weight percent.

3. The polymer interlayer of claim 1, wherein the second poly(vinyl butyral) resin is present in an amount of from about 25 weight percent to about 50 weight percent.

4. The polymer interlayer of claim 1, wherein each plasticized resin in the soft layer of the polymer interlayer has a glass transition temperature ($T_g$) less than 20.0° C.

5. The polymer interlayer of claim 1, wherein the residual hydroxyl content of the third poly(vinyl butyral) resin is the same as the residual hydroxyl content of the first poly(vinyl butyral) resin or the second poly(vinyl butyral) resin.

6. The polymer interlayer of claim 1, wherein the difference between the first residual hydroxyl content and the second residual hydroxyl content is at least 2.0 weight percent.

7. The polymer interlayer of claim 1, wherein the difference between the first residual hydroxyl content and the second residual hydroxyl content is at least 3.0 weight percent.

8. The polymer interlayer of claim 1, wherein the difference between the glass transition temperatures ($T_g$) of the first poly(vinyl butyral) resin and the second poly(vinyl butyral) resin is at least 3.0° C.

9. A polymer interlayer having improved sound insulation, the polymer interlayer comprising:
    at least one soft layer wherein the soft layer comprises a blend of two or more poly(vinyl butyral) resins comprising:
    a first poly(vinyl butyral) resin having a first residual hydroxyl content and a first glass transition temperature ($T_g$);
    a second poly(vinyl butyral) resin having a second residual hydroxyl content and a second glass transition temperature ($T_g$),
    wherein the difference between the first residual hydroxyl content and the second residual hydroxyl content is at least 1.0 weight percent;
    wherein the difference between the first glass transition temperature ($T_g$) and the second glass transition temperature ($T_g$) is at least 1.5° C.; and
    a plasticizer, wherein the first poly(vinyl butyral) resin, the second poly(vinyl butyral) resin and the plasticizer are mixed and melt-extruded to form the at least one soft layer;
    at least one stiffer layer comprising a third poly(vinyl butyral) resin having a third residual hydroxyl content; and
    a plasticizer,
    wherein the polymer interlayer has a damping loss factor (η) (as measured by Mechanical Impedance Measurement according to ISO 16940) of at least about 0.16 measured at two or more different temperatures selected from 10° C., 20° C. and 30° C., and wherein the second poly(vinyl butyral) resin is present in an amount of from about 5 weight percent to about 50 weight percent.

10. The polymer interlayer of claim 9, wherein each plasticized resin in the soft layer of the polymer interlayer has a glass transition temperature ($T_g$) less than 20.0° C.

11. The polymer interlayer of claim 9, wherein the residual hydroxyl content of the third poly(vinyl butyral) resin is the same as the residual hydroxyl content of the first poly(vinyl butyral) resin or the second poly(vinyl butyral) resin.

12. The polymer interlayer of claim 9, wherein the difference between the first residual hydroxyl content and the second residual hydroxyl content is at least 2.0 weight percent.

13. The polymer interlayer of claim 9, wherein the difference between the first residual hydroxyl content and the second residual hydroxyl content is at least 3.0 weight percent.

14. The polymer interlayer of claim 9, wherein difference between the glass transition temperatures ($T_g$) of the first poly(vinyl butyral) resin and the second poly(vinyl butyral) resin is at least 3.0° C.

15. A polymer interlayer having improved sound insulation, the polymer interlayer comprising:
    at least one soft layer wherein the soft layer comprises a blend of two or more poly(vinyl butyral) resins comprising:
    a first poly(vinyl butyral) resin having a first residual hydroxyl content and a first glass transition temperature ($T_g$);
    a second poly(vinyl butyral) resin having a second residual hydroxyl content and a second glass transition temperature ($T_g$),
    wherein the difference between the first residual hydroxyl content and the second residual hydroxyl content is at least 1.0 weight percent,
    wherein the difference between the first glass transition temperature ($T_g$) and the second glass transition temperature ($T_g$) is at least 1.5° C.; and
    a plasticizer, wherein the first poly(vinyl butyral) resin, the second poly(vinyl butyral) resin and the plasticizer are mixed and melt-extruded to form the at least one soft layer;
    at least one stiffer layer comprising a third poly(vinyl butyral) resin having a third residual hydroxyl content; and
    a plasticizer,
    wherein each plasticized resin in the soft layer of the polymer interlayer has a glass transition temperature ($T_g$) less than 20.0° C.

16. The polymer interlayer of claim 15, wherein the second poly(vinyl butyral) resin is present in an amount of from about 5 weight percent to about 50 weight percent.

17. The polymer interlayer of claim 15, wherein the second poly(vinyl butyral) resin is present in an amount of from about 25 weight percent to about 50 weight percent.

18. The polymer interlayer of claim 15, wherein the difference between the glass transition temperatures ($T_g$) of the first poly(vinyl butyral) resin and the second poly(vinyl butyral) resin is at least 3.0° C.

19. The polymer interlayer of claim 15, wherein the difference between the first residual hydroxyl content and the second residual hydroxyl content is at least 2.0 weight percent.

20. The polymer interlayer of claim 15, wherein the difference between the first residual hydroxyl content and the second residual hydroxyl content is at least 3.0 weight percent.

* * * * *